United States Patent [19]

Custer

[11] Patent Number: 5,033,311
[45] Date of Patent: Jul. 23, 1991

[54] VOLUMETRIC FLUID FLOW SENSOR

[75] Inventor: Craig S. Custer, Pompano Beach, Fla.

[73] Assignee: CTE Chem Tech Equipment Co., Inc., Deerfield Beach, Fla.

[21] Appl. No.: 371,247

[22] Filed: Jun. 26, 1989

Related U.S. Application Data

[63] Continuation-in-part of Ser. No. 152,736, Feb. 5, 1988.

[51] Int. Cl.$^5$ ................................................ G01F 1/24
[52] U.S. Cl. ................................. 73/861.53; 73/861.71
[58] Field of Search ........... 73/861.53, 861.54, 861.55, 73/861.56, 861.58, 861.71, DIG. 3

[56] References Cited

U.S. PATENT DOCUMENTS

| | | | |
|---|---|---|---|
| 1,274,642 | 8/1918 | Wagner et al. | 73/861.54 |
| 2,052,022 | 8/1936 | Fisher | 73/861.54 |
| 2,581,588 | 1/1952 | Greene | 73/861.53 |
| 3,368,402 | 2/1968 | Hop et al. | 73/861.54 |
| 4,064,751 | 12/1977 | Deisenroth et al. | 73/861.53 |
| 4,389,901 | 6/1983 | Lake | 73/861.58 |
| 4,507,976 | 4/1985 | Branko | 73/861.54 |

FOREIGN PATENT DOCUMENTS

2123964 2/1984 United Kingdom ............ 73/861.53

Primary Examiner—Herbert Goldstein
Attorney, Agent, or Firm—M. K. Silverman

[57] ABSTRACT

A volumetric fluid flow sensing system includes a pole magnet armature in which the direction of reciprocation of the armature is co-linear with its magnetic axis and, includes a magnetic field sensor within magnetic communication with the magnetic axis for monitoring changes in the magnetic field strength of the magnetic axis. The system includes a housing which defines a path of fluid flow, including an inlet channel having the magnetic armature axially positioned therein, and having an outlet channel radially oriented relative to the axis of the input channel and in fluid communication with the input channel. Further, there is employed an axially positioned calibration spring having an axis in spring force relationship to the magnetic axis of the armature and located co-linearly with the magnetic axis of the armature, to define a point of equilibrium between the spring constant force of the spring and against the armature and that fluid force applied against an inlet channel side of the armature by the volumetric fluid flow to be measured by the fluid flow sensor.

2 Claims, 1 Drawing Sheet

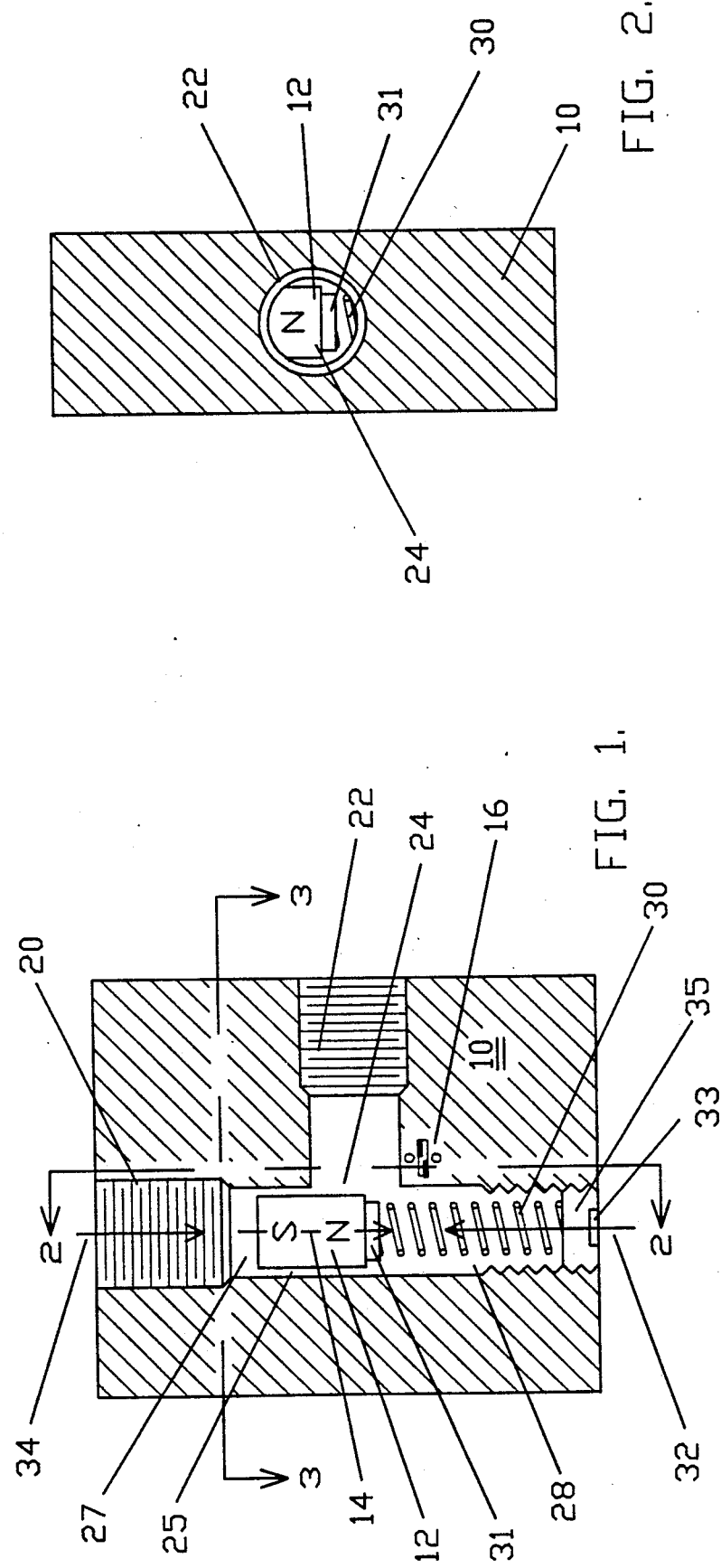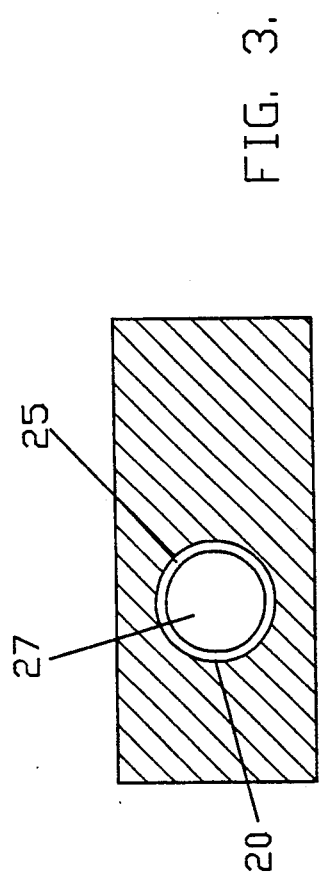

VOLUMETRIC FLUID FLOW SENSOR

REFERENCE TO RELATED APPLICATION

This case is a Continuation-in-Part of application Ser. No. 07/152,736, filed Feb. 5, 1988, entitled Method for Monitoring Ranges of Volumetric Fluid Flow.

BACKGROUND OF THE INVENTION

The instant invention is concerned with a volumetric fluid flow sensing system of a type having a pole magnet armature in which the direction of reciprocation of the armature is co-linear with the magnetic axis thereof. Such a system is further provided with a magnetic field sensor which is in magnetic communication with said magnetic axis. Changes in the field strength of said magnetic axis in the vicinity of said field sensor are monitored to thereby provide an electrical signal which is proportional to changes in volumetric fluid flow passing through an inlet channel and annularly about the pole magnet armature and to an outlet channel of the system.

The prior art includes U.S. Pat. No. 3,759,099 (1973) to McGregor, entitled Flow Meter; and U.S. Pat. No. 4,507,976 (1975) to Banko, entitled Flow Meter with Hall Effect Sensor and Method. However these, and other art known to the inventor, do not involve the use of a magnetic field sensor to measure changes in magnetic flux density of the magnetic axis of the magnetic armature in combination with the control of certain other system variables, these variables including the cross-section of a fluid interface between the fluid inlet channel and fluid outlet channel, modification of the cross-sectional geometry of one or more portions of the path of fluid flow from said inlet to said outlet channel; modification of the geometry, mass or magnetic flux characteristic of the pole magnet armature; or change in the axial location, relative to the axis of the pole magnet armature, of a calibration magnet. Change of any of the variables will affect the actuating characteristic of the armature and thereby of the sensor system.

The underlying importance of the present sensing system resides in the provision of an efficient and economical means for effecting changes in ranges of volumetric fluid flow measurements which, heretofore, could only be achieved through the use of more complex equipment involving substantially greater cost than is the case in the fluid flow sensing system described herein.

SUMMARY OF THE INVENTION

The present invention relates to a volumetric fluid flow sensing system having a pole magnet armature in which the direction of reciprocation of the armature is co-linear with the magnetic axis thereof and, further, including a magnetic field sensor, within magnetic communication with said magnetic axis for monitoring changes in the magnetic field strength of said magnetic axis. The system includes a housing which defines a path of fluid flow, including an inlet channel having the magnetic armature axially positioned therein, and having an outlet channel radially oriented relative to the axis of said input channel and in fluid communication with said input channel; and employing an axially positioned calibration spring having an axis in spring force relationship to a pole of the magnetic axis of the armature to thereby define an adjustable point of equilibrium between the spring constant force of said spring against the armature and that fluid force applied against an inlet channel side of said armature by the volumetric fluid flow through said inlet channel measured by said fluid flow sensing system.

The inventive device may also include one or more means for selectably modifying the cross-sectional geometry of one or more portions of said path of fluid flow, and of selectively modifying the geometry, mass, or magnetic flux characteristic of said pole magnet and/or said axially located spring.

The change of any one of said variables will affect the actuating characteristic of the armature and, thereby, the concentration of the magnetic flux lines which are sensed by said magnetic field sensor. The sensitivity of the volumetric fluid flow sensor across a particular range of fluid flow values may thereby be calibrated.

It is another object of the present invention to provide a system for calibrating ranges of volumetric fluid flow that may be monitored by a volumetric fluid flow sensor.

It is a further object of the present invention to provide a simple and economical system of calibrating and re-calibrating volumetric fluid flow sensors which make use of a pole magnet armature and an associated calibration spring.

The above and yet other objects and advantages of the present invention will become apparent in the hereinafter set forth Detailed Description of the Invention, the Drawings and Claims appended herewith.

BRIEF DESCRIPTION OF THE DRAWINGS

FIG. 1 is a diametric cross-sectional view of a sensor to which the inventive method may be applied.

FIG. 2 is a radial cross-sectional view taken along the radius of the outlet channel of the system and taken along Line 2—2 of FIG. 1.

FIG. 3 is a radial cross-sectional view taken along the radius of the inlet channel and taken along Line 3—3 of FIG. 1.

DETAILED DESCRIPTION OF THE INVENTION

With reference to FIG. 1, there is shown a sensor housing 10 having therein a pole magnet armature 12. This armature includes a magnetic axis 14 which is defined by the indicated north pole and south pole of said armature 12. Said armature is slidably positioned within inlet channel 20, as is further described below.

Also shown in FIG. 1 is magnetic field sensor 16 which is located within magnetic communication of said magnetic axis 14 of said armature 12. As may be appreciated, the closer that magnetic field sensor 16 is to the north pole of axis 14, the greater will be the concentration of magnetic flux lines at the field sensor. Accordingly, it is advantageous to position sensor 16 as close to inlet channel 20 as possible to achieve broad band response.

With reference to FIGS. 1, 2 and 3, the sensor housing 10 may be seen to define said inlet channel 20, an outlet channel 22, and a fluid interface 24 which represents a curved plane of intersection between said inlet and output channels. A fluid force 34, will be applied against lower surface 27 of armature 12 by the volumetric flow measured by the fluid flow sensor.

As may be further noted, said pole magnet armature 12 floats within inlet channel 20, and is separated from the wall thereof by an axial annular region 25. It is, accordingly, through the region 25 that fluid from inlet channel 20 is able to reach fluid interface 24 and outlet channel 22.

In volumetric fluid flow sensors of the instant type, the range of sensitivity of the system is directly proportional to movement, or changes in magnetic flux lines, which are sensed by said magnetic field sensor 16. Accordingly, by calibration or adjustment of the point of actuation, i.e., of upward movement (with reference to the view of FIG. 1) or armature 12, the fluid flow range that the field sensor 16 is capable of measuring can thereby be varied or controlled. In other words, the greater the amount of fluid force 34 that is felt across lower surface 27 of armature 12 without appreciable upward movement of magnetic axis 14, the higher will be the operating range of fluid flows sensed by the system. Conversely, the smaller is the force against lower surface 27 (and its effective radial cross-section) needed for armature actuation, the lower will be the range of volumetric fluid flow that the system can monitor.

Analogously, the cross-sectional geometry of one or more portions of inlet channel 20 and outlet channel 22 may be modified to produce the same type of change in sensitivity as is the case achieved by varying the cross-sectional geometry of armature 12. Further, it is to be appreciated that the mass of armature 12 may also be varied to change the equilibrium point between the upwardly pointing fluid force 34 along axis 14 of armature 12 and a downward force 32 of compression-expansion spring 30. That is, the upward fluid force 34 applied against said surface 27 of armature 12 may be balanced by changing the degree of axial compression of spring 30 within channel 28. This may be readily achieved by rotating outer element 35, using Allen head recess 33, within threads of channel 28, while element 31 of spring 30 urges against the north pole of armature 24.

It has been found that through the use of the above described variables, one need only employ a small axial length of displacement above the region of the north pole of armature 12 to measure rather large ranges of volumetric fluid flow and, as well, to compensate for non-linearity which would otherwise occur when armature 12 is moved too far away from magnetic field sensor 16.

It is to be appreciated that through use of the variables of axial compression of the spring 30, changes in cross-sectional geometry, mass, or magnetic flux characteristic of armature 12, and change in cross-sectional geometry of one or more portions of the fluid flow path from the inlet to outlet channel, one may create volumetric flow sensors which are responsive to both many different ranges of volumetric flow and, where desired, to very small changes within such different ranges.

In a preferred embodiment, said magnet field sensor 16 comprises a Hall-effect or FET semiconductor, this being a semiconductor the gating function of which is determined by the concentration of magnetic flux lines at the gate. It is, however, to be appreciated other types of magnetic sensors may be employed within the scope of the instant system.

While there has been showed and described the preferred embodiment of the present invention, it is to be appreciated that the invention may be embodied otherwise than is herein illustrated and described and that within said embodiment, certain changes may be made in the detail of construction and in the form and arrangement of the parts without departing from the underlying idea of principles of this invention within the scope of the claims appended herewith.

Having thus described my invention, what I claim as new, useful and non-obvious and, accordingly, secure by Letters Patent by the United States is:

1. A volumetric fluid flow sensing system having a pole magnet armature in which an axis of reciprocation of the armature is co-linear with the magnetic axis thereof, the sensor further including a magnetic field sensor, within magnetic communication of a pole of said magnetic axis, for monitoring changes in the positional magnetic field strength of said magnetic axis, the sensing system, comprising:

(a) a housing defining a path of fluid flow including a inlet channel having said magnetic armature axially positioned therein to provide flow relative to a circumferential lateral surface of the armature, and having an outlet channel radially oriented relative to said input channel, and in fluid communication therewith; and (b) within said housing, an axially positioned compression spring having an axis of compression and expansion in alignment with the magnetic axis of said armature and said spring having a base thereof in abutment with that pole of said armature nearest to said magnetic field sensor to thereby define a point of equilibrium between a force of expansion of said spring and a force of volumetric flow within said inlet channel and against the circumferential lateral surface of the armature, and against that pole of said armature opposite to said magnetic field sensor.

2. The system as recited in claim 1, in which said system further comprises:

means for selectably changing the axial position of said spring relative to said armature such that the actuation point of said armature may be calibrated by effecting changes in the axial distance between an adjustable base of said spring and said co-axial magnetic armature.

* * * * *